United States Patent [19]

Seragnoli et al.

[11] Patent Number: 4,524,784
[45] Date of Patent: Jun. 25, 1985

[54] DEVICE FOR FORMING PERFORATIONS IN BAR-SHAPE ARTICLES

[75] Inventors: Enzo Seragnoli; Armando Neri, both of Bologna, Italy

[73] Assignee: G.D Societa' per Azioni, Bologna, Italy

[21] Appl. No.: 477,605

[22] Filed: Mar. 22, 1983

[30] Foreign Application Priority Data

Apr. 13, 1982 [IT] Italy ................................ 48220 A/82

[51] Int. Cl.³ .............................................. A24C 5/60
[52] U.S. Cl. ............................ 131/281; 219/121 LK;
219/121 LL; 219/121 LQ; 219/121 LR;
219/121 LS; 219/121 LT; 219/121 LU;
219/121 LV; 219/121 LY; 219/121 LZ;
219/121 LM
[58] Field of Search ................. 131/281; 219/121 LK,
219/121 LL, 121 LQ, 121 LR, 121 LS, 121 LT,
121 LU, 121 LV, 121 LY, 121 LZ, 121 LM

[56] References Cited

U.S. PATENT DOCUMENTS 4,224,498  9/1980  Grollimund et al. ........ 219/121 LT
4,265,254  5/1981  Koch et al. ................. 219/121 LK
4,281,670  8/1981  Heitmann et al. ................. 131/281

Primary Examiner—V. Millin
Assistant Examiner—Gregory Beaucage
Attorney, Agent, or Firm—Shlesinger, Arkwright, Garvey & Fado

[57] ABSTRACT

A device for forming perforations in bar-shape articles, in which the articles are pierced during their translation through a piercing station by means of bundles of focused laser rays emitted by laser diodes, disposed in fixed positions and distributed in such a way that the distance between each diode and the associated perforation on each said article is, at the instant of emission of the bundle of rays identical to the focal length thereof.

1 Claim, 3 Drawing Figures

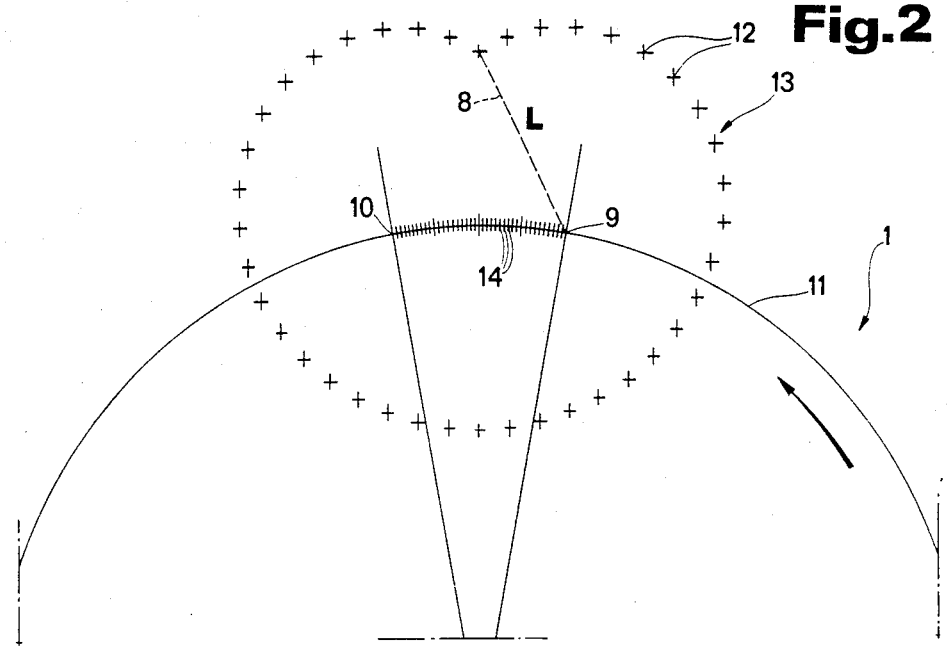
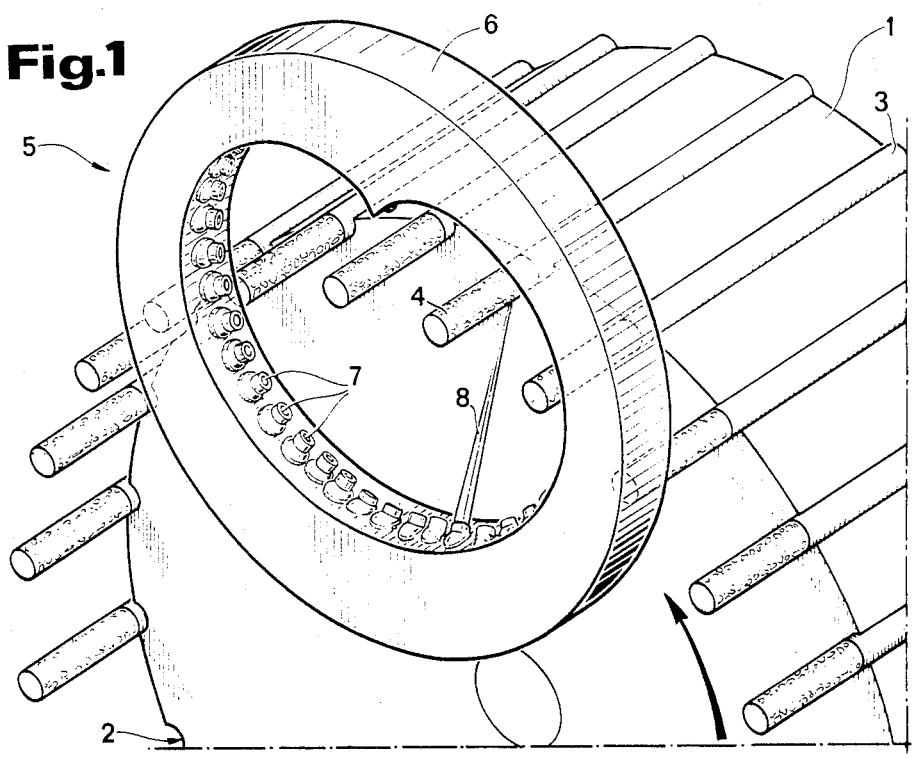

DEVICE FOR FORMING PERFORATIONS IN BAR-SHAPE ARTICLES

BACKGROUND OF THE INVENTION

The present invention relates to a device for forming perforations in bar-shape articles utilising laser rays.

The present invention finds particularly advantageous application in the fields of production of smoking articles, in particular cigarettes, to which the following discussion will make specific reference without loss of generality thereby.

For the purpose of avoiding any doubt about the interpretation of various terms utilised in the following description and claims, it is stated that:

the term "focal length" is to be understood as relating to the distance travelled by a beam of focused laser rays between the zone of emission and the focus; and the term "piercing point" is to be understood as the point at which it is required to form a hole.

In the manufacture of cigarettes it is known to make so-called "ventilated" cigarettes, that is to say cigarettes provided in the region of the filter, with a plurality of holes acting to permit the smoker to draw in a percentage of fresh air together with the smoke, with the double advantage of diluting the inhaled smoke and reducing the temperature and therefore the content of harmful elements.

In the past, to manufacture ventilated cigarettes, needle devices have been used the efficiency of which has become ever reduced with the increase in the productive capacity of cigarette making machines. In fact, if associated with relatively high speed cigarette making machines, the said needle devices wear out in a relatively short time causing frequent interruptions in the productive cycle.

For the reasons explained above the said needle devices have recently been replaced, when possible, by laser ray perforation devices which have been made in one of two different constructional arrangements. In the first of these above mentioned known constructional arrangements a beam of laser rays is emitted in pulses by a fixed laser generator and directed on to a cigarette to be pierced. This latter, during the piercing operation, is made to rotate on itself in such a way that the holes formed in it are distributed in a substantially uniform manner around at least one circumference.

In the other of the two above mentioned known constructional arrangements a laser of high power is used which, for the piercing of each cigarette, emits a single beam of rays which is decomposed by fixed reflectors into a plurality of beams equal in number to the holes to be formed. In this case the holes in each cigarette are made simultaneously without it being necessary to make it turn about its axis.

Both of the two above described known constructional arrangements have significant disadvantages which render practical embodiments problematical. In fact, the first constructional arrangement necessarily requires that each cigarette is rolled between two facing surfaces in such a way as to turn about its axis. Since the cigarettes have already been "softened" following a first rolling performed during the operations involved in connection of a filter, a further rolling to perform the piercing is particularly damaging in that it certainly involves a partial emptying of the cigarette. The second of the two constructional arrangements described above is, on the other hand, difficult to put into practice for purely economic reasons given the high power and, therefore, the high cost of the laser which must be used.

SUMMARY OF THE INVENTION

The object of the present invention is that of providing a device for obtaining perforations in articles of bar-like form, in particular cigarettes, using laser techniques which will be free from the above described disadvantages.

The said object is achieved by the present invention in that it relates to a device for forming perforations in articles of bar-like form, in particular cigarettes characterised by the fact that it includes a piercing station traversed by the said articles to be pierced and including a plurality of laser diodes and a fixed support for the said diodes; these latter being each operable to emit a pulsed beam of focused laser rays, and being distributed on the said support in such a way that the distance between each said diode and the associated perforation on each said article is, at the instant of emission of the associated beam of rays, identical to the focal length thereof.

BRIEF DESCRIPTION OF THE DRAWINGS

Further characteristics and advantages of the present invention will become apparent from the following description with reference to the attached drawings, which illustrate various non limitative embodiments thereof, in which:

FIG. 1 illustrates in a perspective and schematic manner a first embodiment of the present invention;

FIG. 2 is a structural and functional diagram relating to the embodiment of FIG. 1.

DETAILED DESCRIPTION OF THE INVENTION

Figure 3:
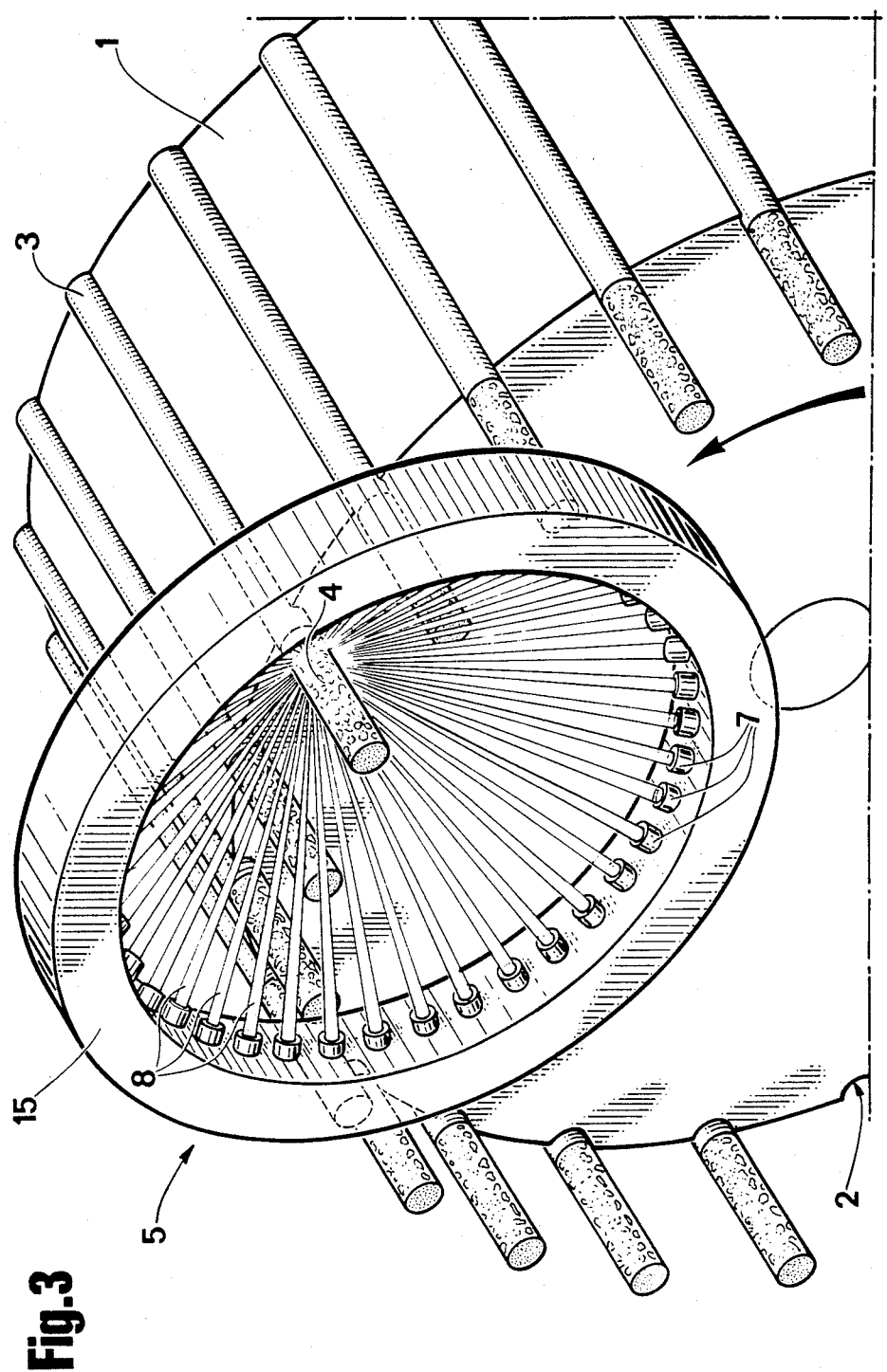
FIG. 3 is a perspective and schematic illustration of a second embodiment of the present invention.

In FIG. 1 there is shown a conveyor drum 1, mounted rotatably about its own axis on a support not illustrated and having a plurality of external seats 2. Each of these latter retains, by suction means not illustrated, a cigarette 3 having a filter 4 projecting out from the associated seat 2.

During its advancement by the drum 1 each cigarette 3 is subjected to the action of a piercing device comprising a piercing station 5 at which there are formed a plurality of perforations not illustrated on the filter 4, the diameter of which perforations is of the order of several tenths of a millimeter. The piercing station 5 includes an annular support 6 for a plurality of laser diodes 7 distributed according to a given law along an inner surface of the support 6. The laser diodes 7 are semi-conductor lasers capable of emitting a focused beam 8 the focal length of which is constant and determined.

The operation of the perforating device of FIG. 1 will now be described with reference to the diagram of FIG. 2.

As illustrated in FIG. 1, the conveyor 1 moves in an anti-clockwise sense in such a way as to transport the cigarettes 3 through the station 5 at a given constant speed. As illustrated in FIG. 2 each cigarette 3 follows during its traverse of the piercing station 5 a piercing arc the beginning of which, in the direction of advancement of the cigarette 3, is indicated 9 and the end of which is indicated 10 on the curve 11 followed by the centres of the cigarettes 3.

During the time for which each cigarette 3 follows the arc 9-10 the width of which is, in the specific case of the illustrated example, equal to the distance between the centres of two successive grooves 2 measured along the circumference of the drum 1, the associated filter 4 is struck in succession by a plurality of beams of focused laser rays 8 emitted in a determined sequence by the laser diodes 7.

In FIG. 2 the centres of the laser diodes 7 are indicated with the points 12 distributed along a curve 13 of the so-called "cardioid" type, and the beams 8 emitted by the diodes 7 are focused on successive points 14 distributed along the piercing arc 9-10 and occupied in succession, during the execution of each hole in the filter 4, by the axis of the said cigarette 3.

The curve 13 is formed in such a way that the distance 'L' between each laser diode 7 and each point 14, which can be assumed to be coincident with a respective point to be pierced on the filter 4, is constantly equal to the focal length of the beams 8. Obviously, the distance 'L' which appears in FIG. 2 and the curve 13 are not the real ones but rather the projections of these onto a plane perpendicular to the axis of the drum 1 given that the annular support 6 is disposed in a position alongside the drum 1 and close to the free ends of the filters 4. The curve 13 can have a different form from that illustrated in FIG. 2, which relates to the case in which the direction of rotation of the drum 1 is opposite to the sequence of activation of laser diodes 7. In each case the curve 13 will have to be always formed in such a way that the distance between each point to be pierced and the associated laser diode 7 measured along the axis of the associated beam 8 is constant and equal to the focal length of this latter.

The embodiment of FIG. 3 is substantially identical to that of FIG. 1, from which it differs from the functional point of view only in that, in this case, the laser diodes 7 are all activated simultaneously and not in succession. This functional difference involves a structural difference which is immediately evident and consistent with the fact that, in this case, the laser diodes 7 are supported by a perfectly circular annular support 15.

The embodiments illustrated in FIGS. 1 and 3 can obviously be modified without by this departing from the scope of the present invention. For example, in a variant not illustrated, the annular supports 6 and 15 can be replaced by similar supports but provided with two adjacent rows of laser diodes 7 in such a way as to be able to form two rings of holes on the filters 4 of the cigarettes 3, or else two rings of holes on the double filter which joins two partly finished cigarettes carried by two adjacent and angularly connected drums 1.

According to this latter variant it is possible to perforate the filters immediately after their application and before the filters themselves are cut in half to give rise to two filter cigarettes 3. Obviously, in this latter case, the double annular supports mentioned above will have to be sub-divided, by means of two cuts, into two half rings disposed one radially outwardly and the other radially inwardly of the space lying between the said two drums 1.

In another variant not illustrated, the number of laser diodes, their activation in sequence, and their distribution on a support is such as to be able to form perforations on two or more cigarettes at a time.

We claim:

1. A device for forming perforations in bar-like articles, in particular cigarettes, characterized by the fact that it comprises a piercing station (5) traversed by the said articles (3) to be pierced and including a plurality of laser diodes (7) and a fixed support (6-15) for the said diodes (7); these latter each being operable to emit a beam (8) of focused and impulsed laser rays, and being distributed on the said support (6-15) in such a way that the distance between each said diode (7) and the associated perforation on each said article (3) is, at the instant of emission of the associated beam of rays, identical to the focal length thereof, said laser diodes (7) disposed on the said support in succession along a curve (13) of the cardioid type, and the said articles (3) are supported by a conveyor (1) for moving them with a uniform motion through the said piercing station (5) in a direction contrary to that in which the said laser diodes (7) are activated in succession with the said sequence of activation.

* * * * *